United States Patent
Schmid et al.

(10) Patent No.: US 6,418,921 B1
(45) Date of Patent: Jul. 16, 2002

(54) METHOD AND APPARATUS FOR CUTTING WORKPIECES

(75) Inventors: Frederick Schmid, Marblehead, MA (US); Maynard B. Smith, Seabrook, NH (US); Chandra P. Khattak, Danvers, MA (US)

(73) Assignee: Crystal Systems, Inc., Salem, MA (US)

( * ) Notice: Subject to any disclaimer, the term of this patent is extended or adjusted under 35 U.S.C. 154(b) by 0 days.

(21) Appl. No.: 09/768,395

(22) Filed: Jan. 24, 2001

(51) Int. Cl.$^7$ ................................................. B28D 1/06
(52) U.S. Cl. ..................................... 125/16.02; 125/21
(58) Field of Search .............................. 125/21, 16.01, 125/16.02, 19; 451/296, 299, 304, 307; 83/39, 49, 651.1

(56) References Cited

U.S. PATENT DOCUMENTS

| | | |
|---|---|---|
| 4,188,936 A | 2/1980 | Stauffer |
| 4,646,710 A | 3/1987 | Schmid et al. |
| 4,727,852 A | 3/1988 | Schmid et al. |
| 5,099,820 A * | 3/1992 | Stricot ..................... 125/16.01 |
| 5,351,446 A | 10/1994 | Langsdorf |
| 5,438,973 A | 8/1995 | Schmid et al. |
| 5,564,409 A | 10/1996 | Bonzo et al. |
| 5,735,258 A * | 4/1998 | Okuno et al. ............ 125/16.02 |
| 5,842,462 A | 12/1998 | Schmid et al. |
| 5,878,737 A | 3/1999 | Hodsden |
| 5,964,210 A | 10/1999 | Hodsden |
| 6,024,080 A | 2/2000 | Hodsden |
| 6,065,462 A | 5/2000 | Hodsden et al. |

OTHER PUBLICATIONS

Cutting with Diamond Wire, Laser Technology West Limited, Colorado Springs, CO.
Millennium Rocking–Slicing Saw, Laser Technology West Limited, Colorado Springs, CO.
Multi–Wire Rocking Saw, Laser Technology West Limited, Colorado Springs, Co.

* cited by examiner

*Primary Examiner*—Timothy V. Eley
*Assistant Examiner*—Dung Van Nguyen
(74) *Attorney, Agent, or Firm*—Hale and Dorr LLP

(57) ABSTRACT

A cutting machine has a blade mounted for reciprocating movement. A workpiece is rotated while the blade is reciprocated, and then the workpiece is rotated through smaller angles to complete the cut. A holder is attached to partially cut slices of the workpiece.

22 Claims, 4 Drawing Sheets

METHOD AND APPARATUS FOR CUTTING WORKPIECES

FIELD OF THE INVENTION

This invention relates to the slicing of crystals and other materials into wafers and, more particularly, to systems for slicing hard and expensive materials with wire blades.

BACKGROUND OF THE INVENTION

To slice wafers from a workpiece, such as an ingot of gallium arsenide, silicon, sapphire, silicon carbide, cadmium telluride, or germanium, it is desirable to provide a radial cut profile between the workpiece and one or more slicing blades, to reduce the length of the cutting blades in contact with the workpiece, and to provide for a relatively constant feed force between the blades and the workpiece.

U.S. Pat. Nos. 4,646,710 and 4,727,852, which are expressly incorporated herein by reference, disclose such slicing systems. In one embodiment, a wafering machine has taut wire blades strung on a bladehead that reciprocally moves the blades over a workpiece. The workpiece is supported by a holder that rocks about an axis perpendicular to the wire blades at a frequency that is less than the frequency of reciprocation of the bladehead. Guide rollers are placed near, and on opposite sides of, the workpiece to reduce the unsupported lengths of the blades. Slicing effectiveness can increase rapidly when there is a decrease in the contact length between the workpiece and the wire blade. Decreasing this contact length while maintaining a constant feed force causes the pressure between the blade and the workpiece to increase, thereby causing more effective cutting.

Generally speaking, it is desirable to slice such expensive material with wire because the kerf width of wire is small, thus resulting in low levels of material waste. Wire can be used with either loose abrasive or abrasive fixed on the wire. Loose abrasive slicing, which involves abrasive tumbling between the wire and the workpiece causing material removal by an indentation process, is also known as a 3-body abrasion because it involves three bodies: the abrasive, the wire, and the workpiece. In the case of fixed abrasive slicing, which is also known as 2-body abrasion, the fixed abrasive particles are forced into the workpiece to plow out the material. When fixed abrasive slicing is used, it is sufficient to attach the abrasive to the cutting edge of the wire.

U.S. Pat. No. 4,384,564, discloses a method of electroplating on the cutting edge of the wire to reduce the kerf width, and U.S. Pat. No. 5,438,973 discloses reducing the kerf width further by using a tear-drop shaped wire. These two patents are also expressly incorporated herein by reference. When loose abrasive slicing is used, wire wear and degradation of the abrasive occurs as the slurry carrying the abrasive becomes contaminated with the kerf and the abrasive breaks down, resulting in high expendable costs for the wire and abrasive.

It is known to cut a workpiece while it is rotating. In U.S. Pat. No. 5,351,446, for example, an annular, inner diameter saw is rotated while an ingot is also rotated to cut until a small central portion is left. A continuous loop wire saw is then used to cut a central portion while the ingot is again rotated. A nub left at the center is then ground down.

In U.S. Pat. No. 5,878,737, an apparatus for fixed abrasive slicing of a workpiece uses a continuous wire that cuts a workpiece that is rotated about its longitudinal axis. This rotation is provided through the use of the engagement of collet fixtures and drive rollers to provide a tangential rotational force. With a continuous wire, high speed can generally be achieved, and such rotation is used to minimize contact length.

In U.S. Pat. No. 5,564,409, a long wire that runs between a feed spool and a take-up spool is used to cut a workpiece using a loose abrasive slurry. The workpiece has an opening in the center. The workpiece is rotated by rotating a shaft and sleeve that extend through the workpiece. Workpieces with such openings may be used for disk drives; workpieces without such openings are used, for example, for semiconductor wafers.

SUMMARY OF THE INVENTION

The present invention features an improved slicing machine that provides a high relative speed between a wire blade and a workpiece surface, while a short contact length is maintained by rotating the workpiece at a high rotation speed, up to 15,000 rpm depending on the diameter of the workpiece and the ability to remove heat. In an exemplary embodiment, the relative speed at the work surface (i.e., surface speed for a 4 inch diameter workpiece) is 13 m/sec at 2,500 rpm, and 26 m/sec at 5,000 rpm. Thus, cutting rates can be achieved that exceed previous cutting rates achieved with rocking by a factor of 50, and that exceed multiwire slurry slicing rates by a factor of 10 or more. In addition, high wafer accuracy can be achieved with low surface damage. The depth of penetration and chip size can be controlled by determining the rotation rate and the infeed rate. For example, when the infeed rate is held constant and the rotation rate is increased, the depth of penetration and chip size per revolution are decreased. The chip size determines the surface finish and depth of damage.

The workpiece is preferably held by attaching spacers against axial ends of the workpiece and rotating the workpiece and the spacers with a motor. By mounting the ends of the workpiece to spacers with wax or epoxy, the workpiece can be balanced such that it can be rotated at high speed without vibration.

The cutting is preferably achieved in at least two stages. In a first stage, the workpiece is rotated continuously for many rotations at a time. These rotations can be all in one direction, or the device can cause the rotation to periodically reverse direction. A second stage is then undertaken after the diameter of the uncut core portion has been reduced to a smaller amount. When the uncut section is reduced to a smaller diameter, there is a risk that the remaining center portion may break. The specific diameter that triggers the change from the first to second stage depends on factors such as the operator's tolerance to risk, experience, and the type of material being cut. For sapphire, for example, it is believed that second stage cutting should begin with about one-quarter inch (6–7 mm) of a central core remaining.

In the second stage, the workpiece is rotated back and forth, preferably through angles less than 360°, and could be lower, such as 20°. In other words, the workpiece oscillates back and forth until the remaining center portion is cut.

Between the first and second stage, a holder is preferably attached to the workpiece to hold the partially cut wafers or substrates while the remaining core is cut.

In the first stage the workpiece can be rotated in one direction for some period and then rotated in the reverse direction to expose the opposite edge of the diamond abrasive for improved cutting efficiency, wire life, or to achieve more uniform kerf to compensate for wear of abrasive, but preferably these alternation are at least one full rotation in each direction.

The present invention further allows for cutting of multiple workpieces with a series of parallel wire blades with the workpieces side-by-side; or workpieces can be connected to a rotating spindle and cut together.

The wire that is used can have diamond or some other abrasive on a cutting side or all around. If all around and if the blade is part of a bladehead, the bladehead is designed in a symmetric manner so that it can easily be turned over to make the wear more even. This method for cutting through whole material can also be used with the loose abrasive method.

The present invention thus provides improved cutting with less risk of breakage, particularly with the two stages of cutting, and also by using a support bar for holding the partially cut pieces. Other features and advantages will become apparent from the following description, including the drawings, and from the claims.

DETAILED DESCRIPTION

According to the present invention, a cutting system provides high relative speed between a workpiece and blade and low blade contact lengths by rotating a workpiece (e.g., hard materials such as silicon carbide, sapphire and silicon, and soft materials, such as gallium arsenide, cadmium telluride, germanium) at high rotary speed. The cutting effectiveness is enhanced by increasing the rotary speed above 100 rpm depending on the diameter of the workpiece, to achieve a velocity that is sufficiently high for effective cutting. A bladehead of the general type shown in incorporated U.S. Pat. No. 4,646,710 is reciprocated at the same time at a rate in the range of 10 to 100 cycles per minute. Alternatively, a continuous loop wire or series of parallel wires could be used.

correlation between the rotation speed of the workpiece and the reciprocation of the bladehead can produce highly effective results. In general, higher rotational speeds of the workpiece improve slicing of materials that are harder or tougher, but the speed is limited by the ability to rotate the workpiece with minimal vibration and to remove heat that is generated. The relative speed between an abrasive on the blade and the workpiece is dependent on the cut radius and the rotation rate, which can be varied to maintain the desired velocity at the cut surface. Rapid rotation of the workpiece relative to the speed of the blade causes the abrasive particles (preferably diamond) to stay in contact with the work for longer periods than are found in cases where the abrasive particles are moving at high speed but the workpiece is stationary or moving slowly.

Figure 1:
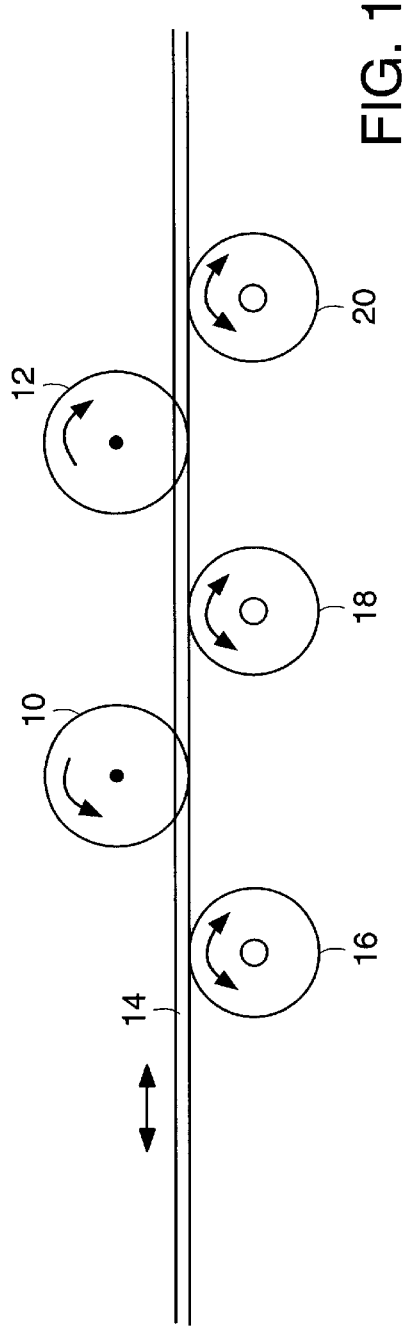
FIG. 1 is a side view illustrating the cutting of multiple workpieces with a wire blade cutting system.

As illustrated generally in the simplified FIG. 1, multiple workpieces 10, 12 can be cut simultaneously with a single bladehead having multiple, parallel diamond plated wires 14. Workpieces 10, 12 are arranged so that they are in a row along the direction of wire 14. Only one wire is shown here, but a bladehead can have multiple wires as shown in the incorporated patents. These wires are reciprocated along their axes with the assistance of guide rollers 16, 18, and 20, each of which has a circumferential groove aligned to receive the wires. The workpieces can all be rotated in the same direction or in different directions as shown. It is preferable for the rotation of each workpiece to be only in one direction to avoid acceleration and decelerations, but stopping and reversing direction periodically is possible as well.

High speed rotation of the workpiece to achieve a higher relative speed between the abrasive of wires 14 and workpieces 10, 12 results in favorable conditions, including: (1) a small contact length that produces high pressure between diamond particles in the wire and the workpiece; (2) a high relative speed between the workpiece and the abrasive combined with a high direct force increases the material removal rate; (3) an extended amount of time during which the abrasive is in the workpiece (much as in single point diamond cutting) that results in effective material removal; (4) a reduction in the potential for diamond pull out, due to the abrasive particles travelling against the workpiece in one direction because the speed generated by the high speed rotation is much higher than the reciprocation velocity; and (5) lapping off the wafers by diamonds on the side of the wire.

Figure 2:
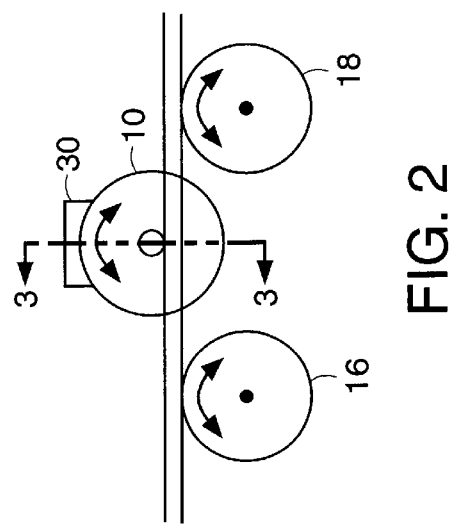
FIGS. 2–3 are a side view and cross-section illustrating a support bar in workpiece rotation.
Figure 3:
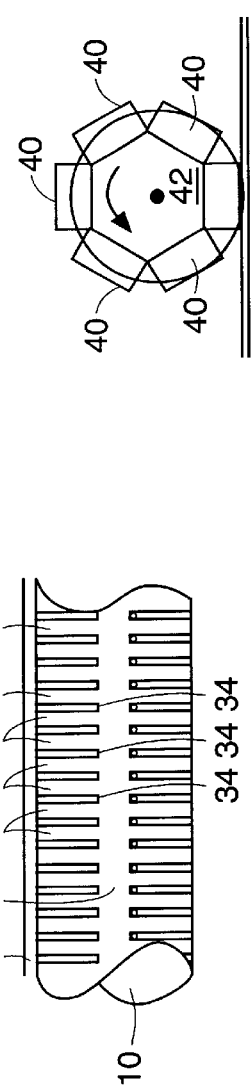

Referring to FIGS. 2 and 3, during the cutting process a diameter of a remaining central core 36 continuously decreases. At some point workpiece 10 can break prematurely where a partial cut is made before the cut is completed. To counter such premature breaking, the system stops the rotation of the workpiece before the diameter of the core becomes small enough to break. A support bar 30 is adhered with wax or an adhesive across the circumferential edges of the partially cut wafers to hold the partially cut wafers. The spaces between partially cut wafers 32 are the kerfs 34 shown with the remaining central core 36.

The slicing is re-started in a second stage after the adhesive between the partially cut wafers and bar 30 has set. A motor (see FIG. 5) causes the workpiece to oscillate through a desired arc, preferably less than 360°, and more preferably smaller, e.g., 20°, to cause short oscillations in the desired cycle time to complete the cut through the center. Such oscillation is helpful to complete the cut and prevent breakage of the central core, particularly in the case of hard materials, although for some materials it may not be necessary to oscillate. After the central core is completely cut, wafers 32 are removed from bar 30 by soaking in a suitable solvent to dissolve the adhesive, or by heating if wax is used.

If a workpiece is cut to make wafers for hard drive discs, the wafers will typically have a hole in the center, and thus, cutting is complete and the rotation is stopped when the cutting action reaches a central spindle on which the workpiece is mounted.

Rectangular shaped workpieces may be cut in the same way as round workpieces; in the case of rectangular shaped workpieces, the diagonal of the rectangle is treated as the diameter.

Figure 4:
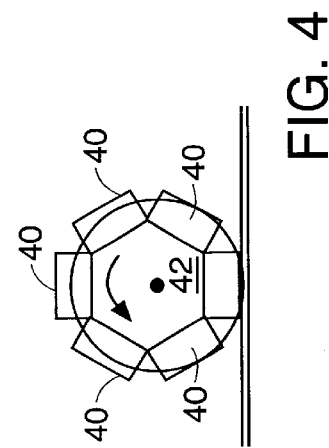
FIG. 4 is a side view showing cutting of multiple pieces.

As shown for example in FIG. 4, rotary cutting of multiple work pieces simultaneously can also be accomplished by attaching multiple small workpieces 40 onto a central mounting spindle 42 rotated during the cutting operation until the cutting action progresses through the workpieces and reaches the central mounting spindle.

The workpieces are fastened to the motorized spindle by mechanical means, such as chucks or collets; or made be held by use of an adhesive such as an epoxy or a wax between mounting members and spacers that are between the workpiece and the mounting members.

Figure 5:
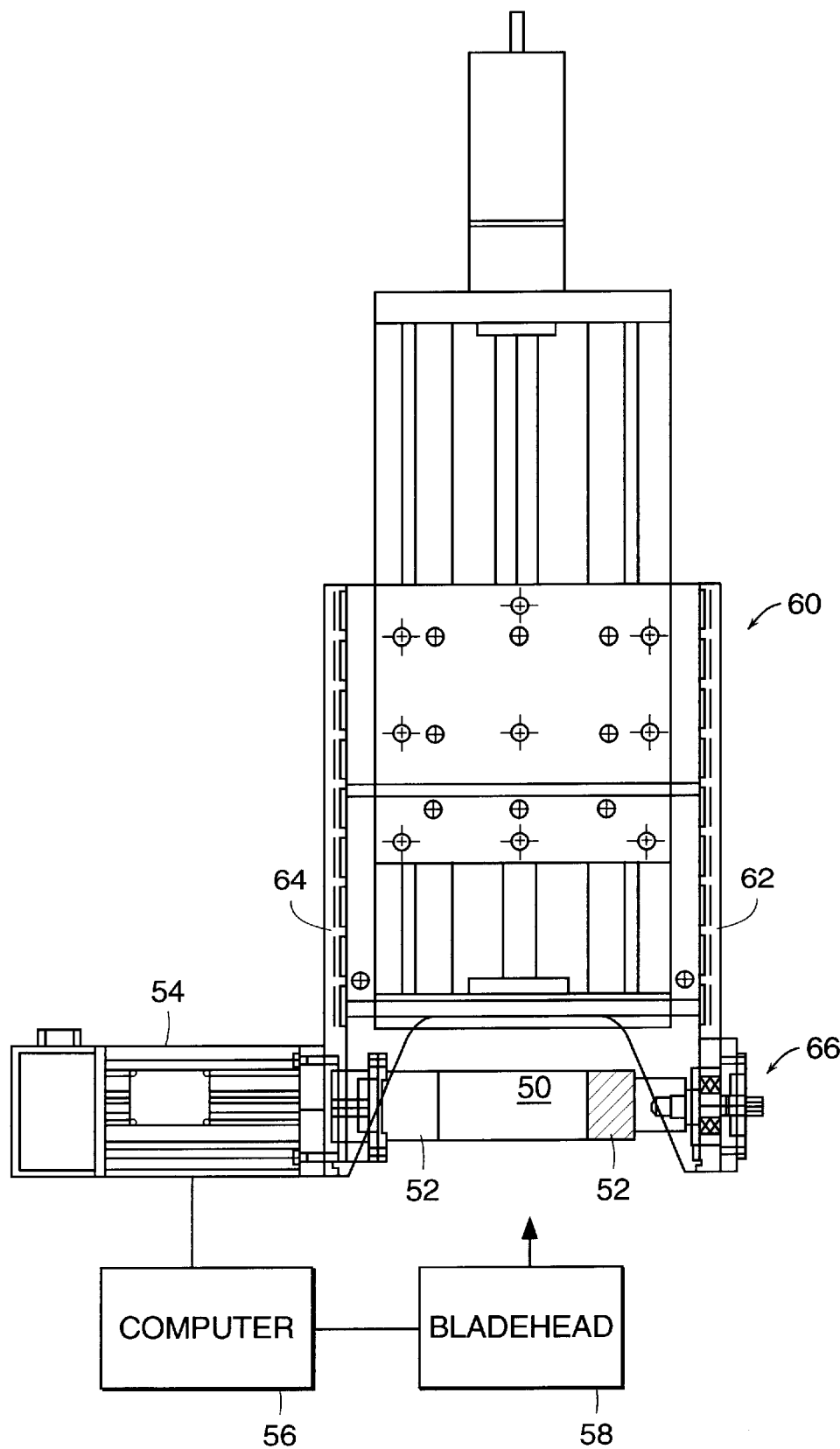
FIGS. 5–7 are front, side, and top views of a device for workpiece rotation.
Figure 6:
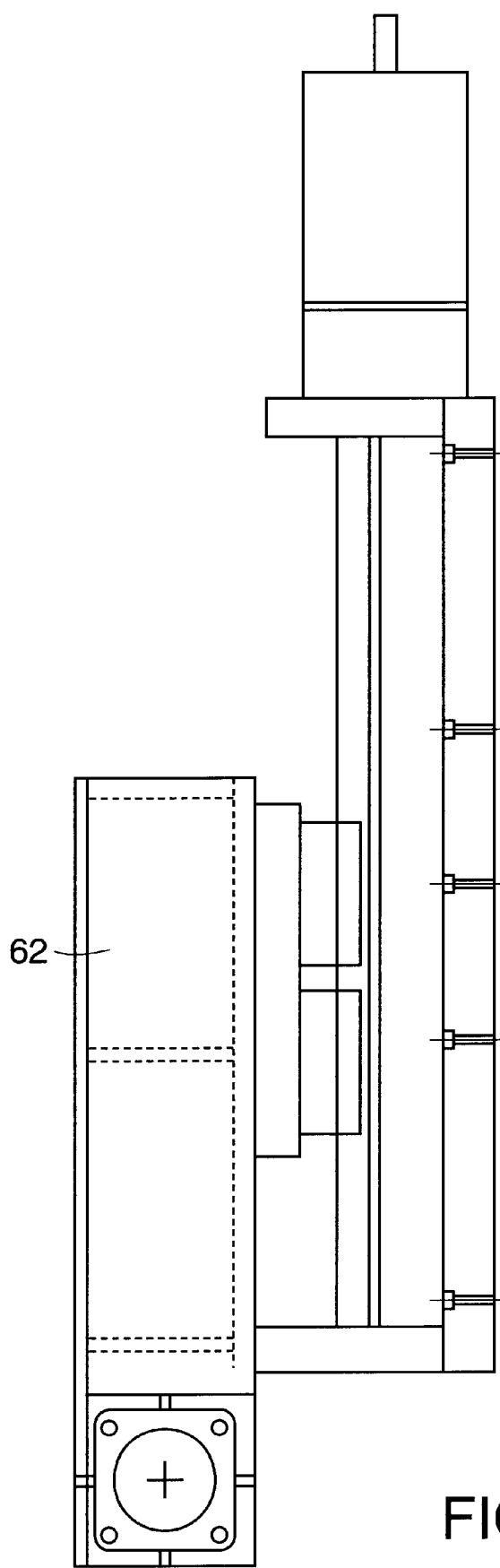
Figure 7:
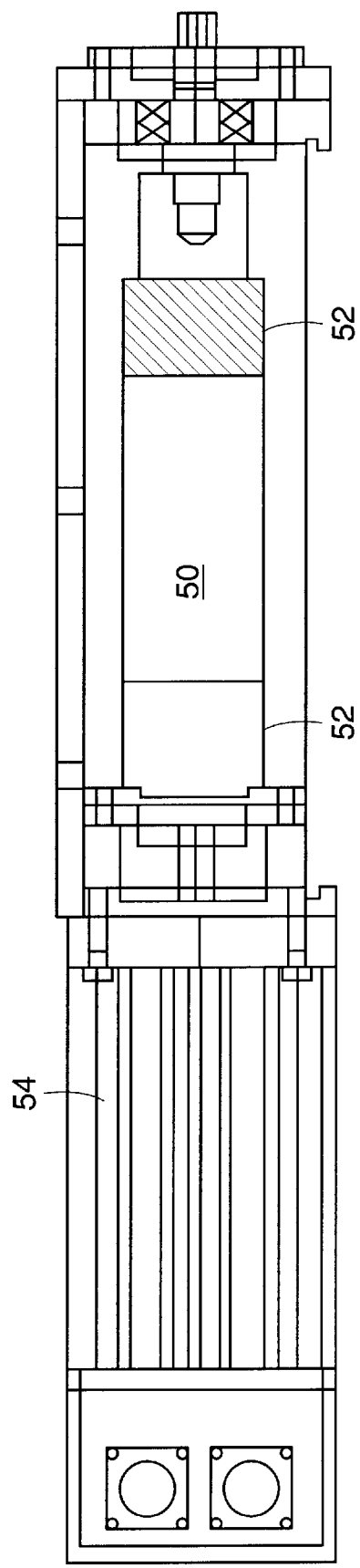

Referring to FIGS. 5–7, a workpiece 50 can be mounted between mounting spacers 52, to which workpiece 50 is glued with an epoxy or attached with a wax in a manner to carefully align workpiece 50 for stable rotation. The spacers can be made of graphite. The workpiece is driven by a motor 54 at speeds up to 15,000 rpm, although the speed of rotation is limited by the amount of heat that can be removed from the interaction between the rotating workpiece and the cutting wires. The motor can rotate the workpiece by direct drive, with a belt, or any suitable way to achieve high speed rotation without excessive vibration.

The rotation is programmable and controllable with a controller 56 to allow the rotational velocity to be ramped as a function of position or time and the rotation can vary as a function of the torque or force feedback from the bladehead. Furthermore, the controller can cause multiple cutting modes, including continuous rotation or short angle oscillation. The controller can include a microprocessor or other programmed general purpose computer, or it can be an ASIC or programmable logic.

The motorized spindle, workpiece, and support are carefully mounted so that the axis of rotation of linear feed motion are orthogonal to the superabrasive coated wires which would be mounted in a bladehead 58 (or could be in continuous loops) under workpiece 50 and movable to workpiece 50. The linear motion of the wires is also variable and can be computer controlled to ramp up or down in coordination with the rotational velocity in order to optimize the cutting process. The infeed rate can also be controlled through a feedback loop using torque or other feedback signal such as wire deflection that is dependent on cutting forces or friction between the workpiece and the cutting wires.

The motor and workpiece are held with a frame 60 that includes two parallel vertical supports 62 and 64. Support 62 has an opening for supporting a bearing 66 at the end of the workpiece opposite the motor. Support 64 has an opening through which a shaft extends from motor 54 to support 62.

Other embodiments are within the scope of the following claims. For example, the workpiece may be rotated in either direction. Rotation of the workpiece in the opposite direction from which it was rotated or the bladehead can be reversed in the bladehead to extend the life of the diamonds by having the opposite side of the diamond tips contract the rotation workpiece. The bladehead wires can have diamonds plated entirely around the wire so the unused diamonds will contract the workpiece to again extend the life of the wires and bladehead. The workpiece may be translated along one or more dimensions, such as horizontally, while being rotated. Multiple holders of the type shown in FIG. 5 can be set up side by side and cut together as shown in FIG. 1. The method for holding partially cut wafers can be used when loose abrasive is used instead of fixed diamond and when flat blades are used instead of wires in the bladehead.

What is being claimed is:

1. A cutting machine for cutting a workpiece having an axis comprising:
   a cutting blade mounted for movement perpendicular to the axis and against the workpiece to cut the workpiece;
   a rotator arranged to rotate the workpiece about the axis;
   a controller for causing the workpiece to rotate through a number of consecutive rotations in one direction, and when the workpiece has a desired reduced remaining diameter from the cutting, causing the workpiece to rotate in opposite directions about the axis with smaller rotations until the remaining portion is cut.

2. The machine of claim 1, further comprising a bladehead for supporting multiple cutting blades and moving with reciprocal motion.

3. The machine of claim 1, wherein the smaller rotations are less than 360°.

4. The machine of claim 1, further comprising a second rotator arranged to rotate a second workpiece about a second rotation axis that is parallel to the axis of the workpiece and generally perpendicular both to the movement of the cutting blade.

5. The machine of claim 4, wherein the rotations of the workpieces are in the same rotational direction.

6. The machine of claim 4, wherein the rotations of the workpieces are in opposite rotational directions.

7. The machine of claim 1, wherein the blade includes a continuous loop of wire.

8. The machine of claim 1, wherein the blade comprises abrasive particles and the workpiece rotation causes the abrasive particles to travel against the workpiece in only one direction.

9. The machine of claim 1, further comprising a support bar coupled to the workpiece when a number of wafers are partially cut from the workpiece.

10. A cutting machine for cutting a workpiece having an axis comprising:
    a cutting blade mounted for movement perpendicular to the axis and against the workpiece to cut the workpiece;
    a rotator arranged to rotate the workpiece about the axis;
    a controller for causing the workpiece to rotate through a number of consecutive rotations in one direction, and when the workpiece has a desired reduced remaining diameter from the cutting, causing the workpiece to oscillate with smaller rotations,
    wherein the workpiece is rotated at a speed of at least 2500 rpm during the rotations in one direction.

11. A cutting machine for cutting a workpiece having an axis comprising:
    a cutting blade mounted for movement perpendicular to the axis and against the workpiece to cut the workpiece;
    a rotator arranged to rotate the workpiece about the axis;
    a controller for causing the workpiece to rotate through a number of consecutive rotations in one direction, and when the workpiece has a desired reduced remaining diameter from the cutting, causing the workpiece to oscillate with smaller rotations,
    wherein the workpiece includes a central support and at least two workpieces connected to the central support such that the workpieces are cut by the blade as the central support is rotated.

12. The machine of claim 11, wherein the oscillations are about the axis and include alternating the direction of rotation of the workpiece.

13. A cutting machine for cutting a workpiece having an axis comprising:
    a cutting blade mounted for movement perpendicular to the axis and against the workpiece to cut the workpiece;
    a rotator arranged to rotate the workpiece about the axis;
    a controller for causing the workpiece to rotate through a number of consecutive rotations in one direction, and when the workpiece has a desired reduced remaining diameter from the cutting, causing the workpiece to oscillate with smaller rotations,
    wherein the workpiece is cylindrical without a central opening and the machine cuts the whole cylinder, further comprising a holder that clamps axial ends of the workpiece.

14. The machine of claims 13, wherein the oscillations are about the axis and include alternating the direction of rotation of the workpiece.

15. A method for slicing a workpiece having an axis comprising:

rotating the workpiece;

moving a blade into contact with the workpiece along a direction perpendicular to the axis of the workpiece;

rotating the workpiece about the axis until a remaining diameter of the workpiece is at a desired location; and oscillating the workpiece through shorter angles until a remaining center portion of the workpiece is cut.

16. The method of claim 15, further comprising, after the rotating and before the oscillating, attaching a holder to the workpiece to hold partially cut portions, so that when the remaining center of the workpiece is cut, the holder will hold the portions separated due to the cutting.

17. The method of claim 15, wherein moving the blade includes reciprocating a bladehead with a plurality of parallel blades to cut the workpiece into a number of slices.

18. The method of claim 15, wherein the blade includes a continuous loop of wire.

19. The method of claim 15, wherein rotating the workpiece includes rotating at least at 2500 rpm.

20. The method of claim 15, wherein a loose abrasive is used to slice through the workpiece.

21. The method of claim 15, wherein the shorter angles are less than 360°.

22. A method for slicing a workpiece having an axis comprising:

rotating the workpiece;

moving a blade into contact with the workpiece along a direction perpendicular to the axis of the workpiece;

rotating the workpiece about the axis until a remaining diameter of the workpiece is at a desired location; and attaching a holder to the workpiece to hold partially cut portions, so that when the remaining center of the workpiece is cut, the holder will hold the portions separated by the cutting.

* * * * *